United States Patent
Humble et al.

(10) Patent No.: US 12,535,988 B2
(45) Date of Patent: Jan. 27, 2026

(54) INDICATING HEALTH, STATUS, OR CONDITION OF A MONITORED TARGET USING DEGRADED AUDIO QUALITY

(71) Applicant: Salesforce, Inc., San Francisco, CA (US)

(72) Inventors: Charles Humble, Hoschton, GA (US); Stephen F. Buchwald, Strongsville, OH (US); Benjamin James Lutterbach, Greensburg, IN (US); George Khazal, Indianapolis, IN (US); Sze K. Li, Bellevue, WA (US)

(73) Assignee: Salesforce, Inc.

( * ) Notice: Subject to any disclaimer, the term of this patent is extended or adjusted under 35 U.S.C. 154(b) by 308 days.

(21) Appl. No.: 17/934,961

(22) Filed: Sep. 23, 2022

(65) Prior Publication Data

US 2024/0103797 A1    Mar. 28, 2024

(51) Int. Cl.
G06F 3/16      (2006.01)

(52) U.S. Cl.
CPC .............. G06F 3/165 (2013.01); G06F 3/162 (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |

(Continued)

*Primary Examiner* — Quynh H Nguyen
(74) *Attorney, Agent, or Firm* — Ingrassia Fisher & Lorenz, LLP

(57) ABSTRACT

A system is programmed and operated to perform a method of indicating health, status, or condition of a monitored target. In certain implementations, the method involves: obtaining at least one metric associated with the monitored target; determining a level of audio degradation to be applied to a source digital media file that conveys default audio content, wherein the level of audio degradation is determined as a function of the obtained at least one metric; modifying the source digital media file in accordance with the determined level of audio degradation, resulting in modified audio data; and controlling playback of the modified audio data to serve as an audible indicator of the health, status, or condition of the monitored target.

19 Claims, 5 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,424,348 B1* | 8/2016 | Riggs-Zeigen ......... G06F 3/167 |
| 9,833,142 B2* | 12/2017 | Horseman ............... A61B 5/002 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0196988 A1* | 10/2004 | Moulios ............... G10H 1/0091 |
| | | 381/119 |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0113725 A1* | 5/2007 | Oliver ...................... G10H 1/40 |
| | | 84/612 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0112536 A1* | 5/2010 | Claassen ................ G16H 20/30 |
| | | 434/258 |
| 2011/0023077 A1* | 1/2011 | Simon ................ H04N 21/4438 |
| | | 725/134 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0206540 A1* | 7/2015 | Green ................. G11B 27/034 |
| | | 704/207 |
| 2019/0099134 A1* | 4/2019 | Bennett .................... A61B 5/11 |
| 2023/0063782 A1* | 3/2023 | McSweeney .......... G08B 21/18 |

\* cited by examiner

INDICATING HEALTH, STATUS, OR CONDITION OF A MONITORED TARGET USING DEGRADED AUDIO QUALITY

TECHNICAL FIELD

Embodiments of the subject matter described herein relate generally to diagnostic and monitoring systems that monitor the health, status, or condition of one or more target systems, entities, objects, or the like.

BACKGROUND

Electronic and computer-implemented systems can monitor, diagnose, and/or report the status, condition, or health of any number of targets of interest. For example, a dashboard application can display or otherwise provide information that indicates the current status, condition, or health of a monitored target in an ongoing manner. A user of such a dashboard application can observe trends, obtain detailed statistics or data related to the monitored target, and otherwise manipulate features of the dashboard application as needed to investigate problems, to respond to alerts or warning messages, and the like.

Health monitoring systems can be deployed, customized, and configured as needed to address any particular requirements of the monitored targets. For example, a monitoring system can be suitably designed and configured to indicate the health status of a complex database system that includes many computer based server systems arranged in a cluster architecture—the monitoring system can indicate the current operating health of each cluster in an ongoing manner and generate warnings or alerts as needed to flag unhealthy or moderately unhealthy clusters. As another example, a monitoring system can be suitably designed and configured to indicate the operating state or capacity of a resource, such as computer network bandwidth, computer processor loading, or computer memory usage. As yet another example, a monitoring system can be suitably designed and configured to indicate a measurable or observable quantity, value, index, or phenomena, such as: the weather in a chosen region; a snow pack level; a stock market index; the number of unread emails in a user's email inbox; or the score in a sports event, game, or match.

Accordingly, it is desirable to enhance the functionality and effectiveness of existing systems that monitor or diagnose the health, condition, or status of one or more targets of interest. To this end, certain desirable features and characteristics will become apparent from the subsequent detailed description and the appended claims, taken in conjunction with the accompanying drawings and the foregoing technical field and background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
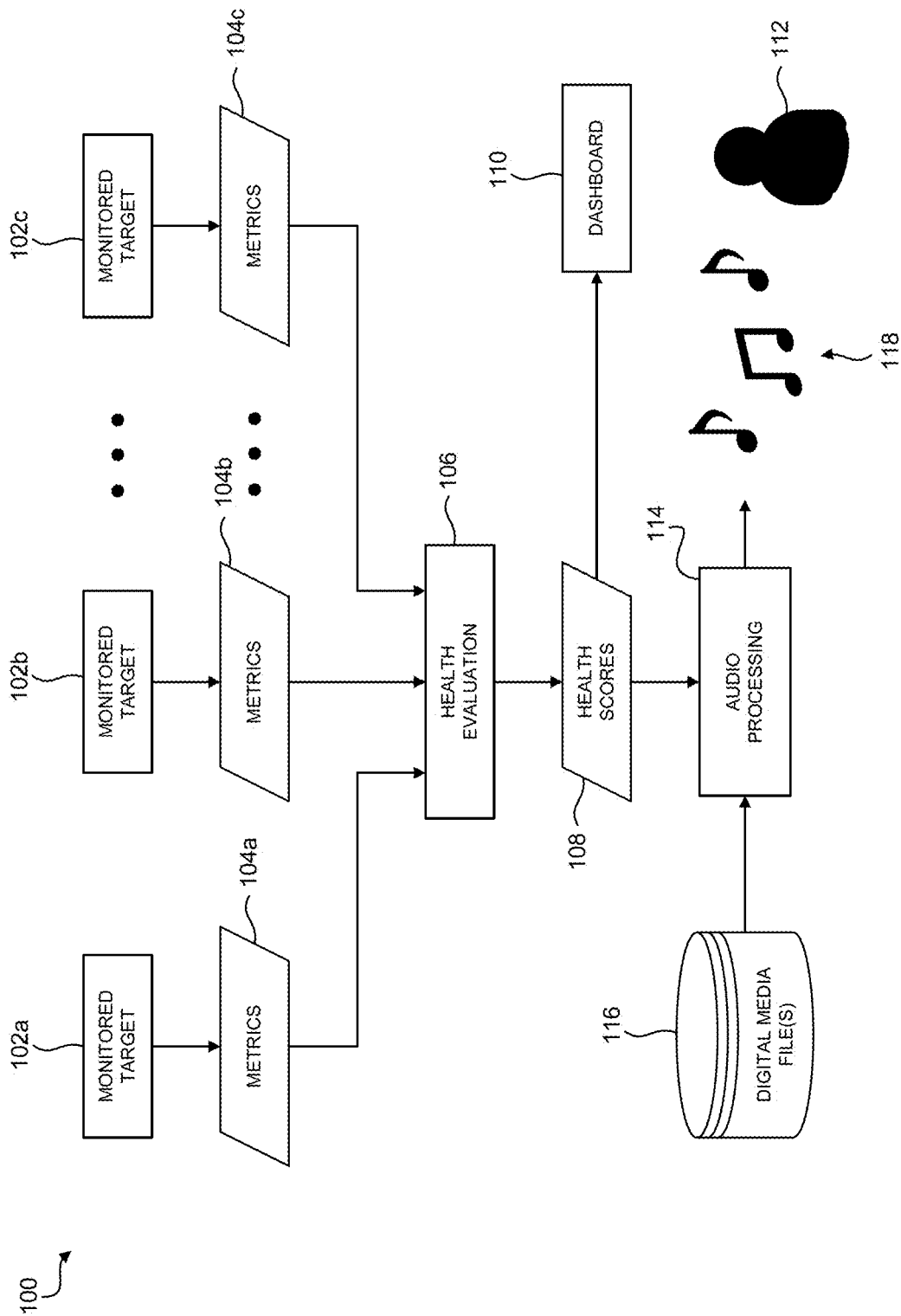
FIG. 1 is a simplified block diagram representation of an exemplary embodiment of a computing system to indicate health, status, or condition of at least one monitored target.

The subject matter presented here relates to a methodology for indicating the health, status, and/or condition of one or more monitored targets. Hereafter, "health" is used to refer to a measurable or quantifiable status, condition, state, mode, or health (or any combination thereof) of at least one monitored target. As described in more detail below, the current health of the monitored target(s) is indicated or represented by audibly modifying, degrading, corrupting, distorting, altering, or changing the sound of a source digital media file, e.g., a digital audio or music file, during playback. The modified representation of an otherwise familiar or well known audio track or song serves as an easily detectable indicator of the health of the monitored target(s). In certain embodiments, for example, a default digital music file is played in an unmodified form when the health of a monitored target is determined to be within a normal or acceptable range. If, however, the health of the monitored target is determined to be within an alerting range (that is abnormal, atypical, or unusual), then the default digital music file is modified such that playback of the modified digital music file conveys a noticeably distorted or corrupted version of the otherwise familiar music.

In accordance with certain exemplary embodiments, a musical implementation of data monitoring obtains and processes numerical health scores for the monitored targets, and represents the health of the monitored targets musically (in the audio domain). In this regard, music has some advantages over traditional visual methods that provide graphical indications of health. For one, music engages humans subconsciously, allowing concentrated effort on central tasks while also closely tracking important metrics. A melody merges well with a user's work environment by acting as background music for their work tasks. For many, music can even increase productivity, concentration, and creativity. Comparing this to a potentially cluttered, visually complicated, and "information overloaded" visual dashboard, a musical solution can be much less intrusive and more fit for multitasking. Moreover, human ears are uniquely capable of identifying out-of-tune pitches in music (i.e., dissonance), and a listener can easily detect when a familiar or favorite song sounds "off" due to distortion, static, or the like. A typical user (one who may not be an audio engineer or a professional musician) can quickly and immediately take notice when music sounds problematic as the melodic pattern becomes disrupted. These advantageous characteristics of music can be leveraged and utilized in the disclosed data monitoring application, by way of data sonification—where data (such as a health score of a monitored target) is represented by music and degraded representations of that music.

The system and methodology presented here are distinguishable from other data sonification techniques that involve the conversion of data into music. In contrast to such existing techniques, the system and methodology disclosed here alter music as a function of health scoring data, such that certain audible characteristics of the music during playback are changed. In accordance with some embodiments, the alteration method is performed by shifting the pitch of audio and making the melody go out of tune at an interval associated with data health. Healthy data will rarely if ever shift the pitch, struggling data might shift the pitch every 60 seconds, and unhealthy data might shift the pitch every five seconds, for example. This difference in approach results in a solution that is more flexible and practical as any song can be used as the base melody. meanwhile, the data conversion approach translates each data point into a note on a piano, guitar, or other available instruments, resulting in a much more restricted, repetitive melody. When considering data monitoring where melodies could be listened to for five minutes to five hours or more, some additional customization can offer a more flexible and practical solution. Additionally, the alteration approach is much more representative of a health obstruction as the sound of dissonance is widely interpreted as "out of place," appropriately aligning the interpretations of the music and the data.

FIG. 1 is a simplified block diagram representation of an exemplary embodiment of a computing system 100 to indicate health of at least one monitored target 102. It should be appreciated that FIG. 1 depicts a simplified representation of the system 100 for purposes of explanation and is not intended to be limiting. A monitored target 102 can be any device, system, object, platform, architecture, construct, database, service, software, application, stack, or entity having one or more measurable, detectable, calculatable, or estimatable characteristics (e.g., a quantity, value, level, score, index, grade, signal, anomaly, or phenomena). In certain implementations, a monitored target 102 may be one or more of the following, without limitation: a server cluster in a database, virtualization, or other hyper-converged infrastructure system; a data network link or connection having measurable bandwidth and/or throughput; a computing device or a processor of a computing; a memory device or an allocation of memory associated with a computing device (e.g., random access memory); the current or forecast weather in a monitored region or geographical area; the current or forecast snow pack level in a monitored region or geographical area; a current or forecast stock market index; a current or forecast share price of an individual stock, a mutual fund, or other investment vehicle; the number of unread emails in a user's email inbox; the score or other statistics associated with a sporting event; the current or forecast value of real estate, a vehicle, or other item.

FIG. 1 depicts an implementation where a plurality of monitored targets 102 are being supervised. In some embodiments, however, the system 100 is responsible for tracking the health of only one monitored target 102. The plurality of monitored targets 102 may be similar, equivalent, or redundant (e.g., each monitored target 102 may be a different cluster that includes a number of server devices or systems), or the plurality of monitored targets 102 may be different, distinctive, or otherwise distinguishable in form and functionality (e.g., one monitored target 102a is a cluster of server devices, another monitored target 102b is associated with a stock market index, and yet another monitored target 102c is associated with currently available bandwidth of a supervised data network).

The system 100 measures, obtains, generates, calculates, or estimates at least one metric 104 associated with the monitored targets 102, wherein metrics 104 for a monitored target 102 represent measurable, quantifiable, or observable characteristics of the monitored target 102 that are indicative of the health of the monitored target 102. In certain implementations, the system 100 itself collects and processes the metrics 104. Alternatively or additionally, the system 100 can collaborate with at least one external service or application that provides collected metrics 104 to the system 100 for handling and processing. For the exemplary embodiment shown in FIG. 1, the system 100 obtains a respective set of metrics 104 for each of the monitored targets 102. Accordingly, the system 100 obtains at least one metric 104a for the monitored target 102a, at least one metric 104b for the monitored target 102b, and at least one metric 104c for the monitored target 102c. The metrics 104 will be contextually appropriate and relevant for the corresponding monitored target 102. For the example where the monitored targets 102 are server clusters, relevant metrics 104 may indicate, without limitation: the current load; population; density; and a current measure of balance associated with the plurality of servers in the cluster. Additional specific metrics associated with a server implementation may include, without limitation: storage IO/latency; cache; checkpoint; batch; compilation rates. As another example, relevant metrics may indicate, without limitation: application performance; latency; request and return size/frequency; scaling level; pool size. As another example related to a financial services or market implementation, relevant metrics may indicate, without limitation: market index; market cap; delta/change; or predefined exceedance thereof.

The obtained metrics 104 can be processed or analyzed in an appropriate manner to determine the current health status or health level of at least one of the monitored targets 102. In this regard, the system 100 may include or cooperate with a health evaluation system, service, or application 106 that receives or accesses the metrics 104 and processes the metrics 104 in an appropriate manner to generate health scores 108 for the monitored targets 102. In accordance with the exemplary embodiment contemplated here, each health score 108 is expressed as a number that falls within a predetermined range of potential values. The overall range of potential values can be separated into any number of ranges corresponding to different health conditions. In some implementations, the various health ranges (e.g., a normal range, a warning range, an alerting range, etc.) are exclusive of one another, and there is no overlapping between any two ranges. In other implementations, however, some of the health ranges may overlap. It should be appreciated that the overall range of health scores 108 and the defined boundaries of the health ranges can be customized and configured as appropriate to the particular implementation, the type of monitored targets 102, and/or the particular metrics 104 that are evaluated. Furthermore, the system 100 need not utilize fixed (static) boundaries for the health ranges, and one or more of the health ranges could be dynamic in nature and/or adjustable or customizable.

It should be noted that the health scores 108 may be considered to be another metric 104 associated with health of the monitored targets 102. In this regard, a health score 108 may be a metric 104 that is based on or calculated from one or more other metrics 104. That said, the health scores 108 are easy to understand, process, and interpret. To this end, the system 100 may include or cooperate with at least one dashboard system, service, or application 110. The dashboard application 110 is an interactive graphical tool that allows the user 112 to quickly visualize the status and health of the monitored targets 102, and that also allows the user 112 to access further details, data, or statistics related to the monitored targets 102. The dashboard application 110 can be maintained and updated in an ongoing manner to allow a user 112 to monitor the health, status, or condition of the monitored targets 102. The dashboard application 110 can be implemented using one or more graphical user interfaces (GUIs) intended for presentation to the user 112. The exemplary embodiments contemplated here utilize at least one dashboard application 110 to indicate at least some of the metrics 104 in association with the corresponding monitored targets 102. Moreover, exemplary embodiments of the dashboard application 110 can be suitably designed and configured to indicate the health scores 108 in association with the corresponding monitored targets 102.

Figure 2:
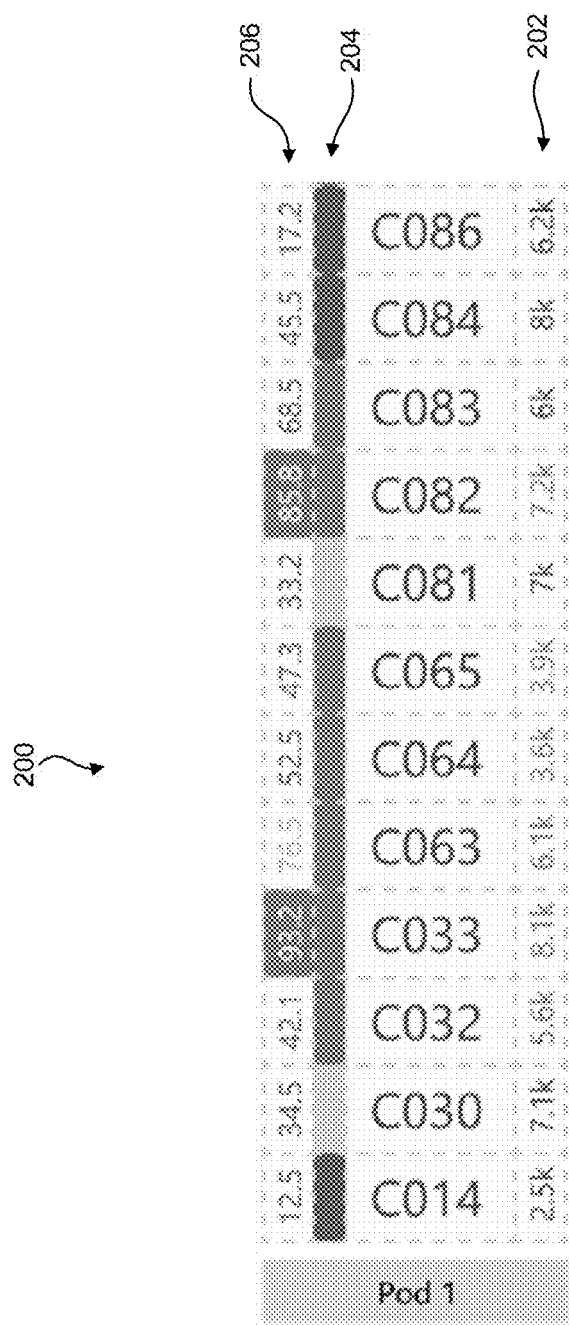
FIG. 2 is a graphical representation that conveys cluster health information associated with a database system.

FIG. 2 is a graphical representation of a dashboard element 200 that conveys cluster health information associated with a database system. FIG. 2 depicts content that could be included in a dashboard application 110 that is used when the monitored targets 102 are server clusters. The depicted dashboard element 200 is arranged and configured in a manner that is appropriate for the particular use case. It should be appreciated that the dashboard application 110 can include any number of graphical dashboard elements, and that the arrangement, format, content, and/or functionality of any given dashboard element can be modified as needed to suit the needs of the particular use case. Thus, the dashboard element 200 shown in FIG. 2 is merely one example of an element that might be maintained and updated in connection with the dashboard application 110.

The dashboard element 200 illustrated in FIG. 2 includes segments or columns for twelve clusters (labeled C0xx). For this particular example, the twelve clusters are included in one pod of a database architecture (labeled Pod 1). The bottom row 202 of the dashboard element 200 includes numerical metrics that indicates the current amount of loading on each cluster. Although not required, the values that appear in the bottom row 202 can be color coded, highlighted, or otherwise rendered in a visually distinguishable manner that indicates whether the current load is light, normal, heavy, etc. For example, the load value for a given cluster can be displayed using an orange or red font to indicate that the cluster is highly loaded or is overloaded. The second row 204 of the dashboard element 200 is utilized to indicate another metric: load balancing of each cluster (this assumes that each cluster includes a plurality of nodes or physical server devices, such that the cluster load can be distributed among the plurality of nodes/devices). Although not required, the illustrated implementation utilizes different colors to visually indicate balancing of each cluster. For the depicted dashboard element 200: a green segment indicates a balanced cluster; a red segment indicates an unbalanced cluster; and a yellow segment indicates a cluster that is moderately balanced or moderately unbalanced.

The first row 206 of the dashboard element 200 is utilized to indicate the health score of each monitored cluster. The example presented here generates health scores that fall within a predetermined range, such as 0 to 100, where higher scores correspond to better health and lower scores correspond to worse health. Although not required, the health scores that appear in the first row 206 can be color coded, highlighted, or otherwise rendered in a visually distinguishable manner that indicates whether a given health score is within a normal range, a warning range, an alerting range, or the like. For example, health scores that fall within a designated normal range can be displayed using a green font or shading, health scores that fall within a designated alerting range can be displayed using a red font or shading, and health scores that fall within a designated warning range can be displayed using a yellow or amber font or shading. In this regard, FIG. 2 depicts a current state where the health scores for cluster C033 (health score 93.2) and cluster C082 (health score 85.8) fall within the alerting range. Consequently, those two health scores are highlighted in a visually distinctive and conspicuous manner (e.g., red font or red shading as shown). The dashboard element 200 also conveys that the health score for cluster C063 (health score 76.5) falls within the warning range. Accordingly, the health score for cluster C063 is displayed in a distinguishable yellow or amber font. The health scores for all of the remaining clusters fall within the normal range and are displayed in a distinguishable green font. This type of color-coded scheme makes it easy for the user 112 to quickly assess the current status of the clusters. In certain embodiments, the individual cluster segments are represented by selectable GUI elements that allow the user 112 to view more detailed information regarding a selected cluster.

The example depicted in FIG. 2 considers scores within the overall range of 0 to 100, and uses three different scoring ranges to indicate three categories of health status. An implementation of the methodology presented here can be designed and operated to contemplate any appropriate range or domain of health scores, and any number of different ranges that indicate health status. Moreover, although the example of FIG. 2 associates higher scores with poor health status, an alternative implementation can instead associate lower scores with poor health status and higher scores with healthy status.

Referring again to FIG. 1, the health scores 108 can also be provided to a suitably configured audio processing system, service, or application 114. The audio processing application 114 obtains or accesses source digital media files 116 (which may be stored in a local database or memory element, stored in a cloud storage system, stored in a portable memory storage device, or the like) for playback or presentation to the user 112. A source digital media file 116 can be any type of file, container, or streaming format that conveys default audio content that can be handled by the audio processing application 114. In this regard, a source digital media file 116 can be a digital music file that conveys music content, and the audio processing application 114 can accommodate any number of individual digital music files, a playlist of digital music files, or the like. As another example, a source digital media file 116 can be a digital video file that includes or otherwise conveys default audio content. As yet another example, a source digital media file 116 can be a digital audio file that conveys background sound, background noise, tones, frequencies, or the like.

The audio processing application 114 may include appropriate digital media playback functionality that can drive one or more speakers (not shown) to generate audio output 118. The audio output 118 may be music, a soundtrack, speech, background noise or tones, or any type of audible sound. The audio processing application 114 is suitably configured and operated to modify a source digital media file as a function of the health score(s), such that the audio output 118 can serve as an audible indicator of the health, status, or condition of the monitored targets 102. In accordance with the exemplary embodiment presented here, the audio processing application 114 degrades, corrupts, or otherwise alters at least one characteristic of the source audio content as a function of the health scores 108 (and/or as a function of the collected metrics 104), such that the sound quality of the audio output 118 changes to indicate whether the monitored target is healthy, unhealthy, or trending between a healthy and unhealthy state.

For ease of description, FIG. 1 depicts a number of blocks that represent certain functionality, program logic, devices, systems, applications, services, modules, and the like. It should be appreciated that an implementation of the system 100 may employ any number of physical hardware devices or systems to support the desired functionality. For example, the functionality of the health evaluation application 106, the dashboard application 110, and the audio processing application 114 can be executed using a single hardware system or device, or a plurality of distributed hardware systems or devices that are in communication with one another as needed. Moreover, FIG. 1 does not separately show a data communication network (or multiple networks) that support data communication within the system 100. In practice, the system 100 can utilize any number of tangible and/or wireless data communication networks if so desired.

Figure 3:
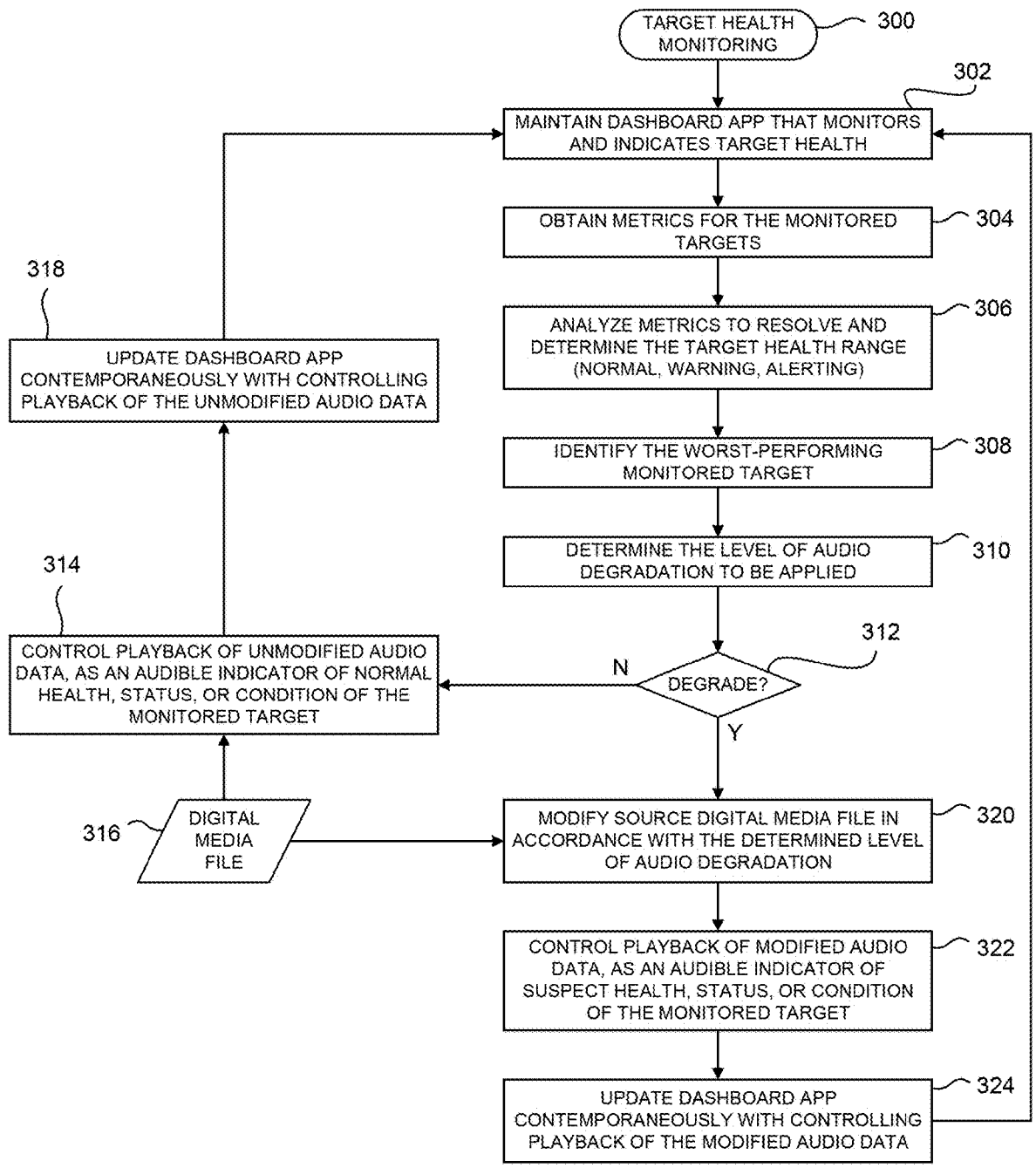
FIG. 3 is a flow chart that illustrates an exemplary embodiment of a method of indicating health, status, or condition of at least one monitored target.

FIG. 3 is a flow chart that illustrates a process 300 that relates to health monitoring of one or more targets of interest. The process 300 represents an exemplary embodiment of a method of indicating health, status, or condition of at least one monitored target. The various tasks performed in connection with the process 300 may be performed by software, hardware, firmware, or any combination thereof. For illustrative purposes, the following description of the process 300 may refer to elements mentioned above in connection with FIGS. 1 and 2. In practice, portions of the process 300 may be performed by different elements of the described system, e.g., one or more of the systems, services, components, or applications shown in FIG. 1. It should be appreciated that the process 300 may include any number of additional or alternative tasks, the tasks shown in FIG. 3 need not be performed in the illustrated order, and the process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

The following description of the process 300 assumes that a plurality of targets are being monitored or observed, and that at least one dashboard system, service, or application (of the type described above) has been deployed. Accordingly, a dashboard application is maintained, operated, and updated in an appropriate manner (task 302). Although not always required, this example assumes that the plurality of monitored targets are of the same type, such as a plurality of clusters as depicted in FIG. 2. As further examples, the plurality of similar targets could be a fleet of monitored vehicles, a number of personal computers operating within an organization, or vital statistics for a group of monitored athletes. As mentioned above, the dashboard application is a graphical tool that can be used to monitor the health, status, or condition of the monitored targets in an ongoing manner. In connection with such monitoring, the process 300 obtains at least one metric associated with each monitored target (task 304), wherein the obtained metrics individually, collectively, or in any combination are indicative of the health of the targets.

The obtained metrics may include "raw" data, measurements, or values that quantify or are otherwise indicative of the health, status, or condition of the monitored targets. Moreover, task 304 may obtain, generate, or calculate at least one metric, based on one or more other obtained metrics. For example, task 304 may obtain a metric formatted as a numerical score that is derived or calculated from one or more other collected metrics for a monitored target. As described above with reference to the dashboard element 200, a numerical health score can be generated to quantify the health, status, or condition of each monitored target.

The process 300 may continue by analyzing the metrics to resolve and determine whether the health, status, or condition of each monitored target is within a normal range, a warning range, or an alerting range (task 306). Although this example considers three different ranges, an implementation may include only two ranges or more than three ranges. As described above, certain embodiments utilize a simple numerical score and numerically defined ranges to categorize the current health of the monitored targets. The current health range for a given target is used to determine a level of audio degradation to be applied to a source digital media file, for purposes of an audible health indicator. In accordance with this example, the process 300 analyzes the metrics (e.g., checks the health scores) to identify the worst-performing/unhealthiest target of the plurality of monitored targets (task 308). This allows a user to be notified of important status changes and to quickly focus on high priority action items.

The process 300 continues by determining the appropriate level of audio degradation to be applied to a source digital media file that conveys audio content (such as music), wherein the level of audio degradation is determined as a function of the obtained metric(s) and/or as a function of the health score that corresponds to the monitored target of interest (task 310). For this example, when the analyzing step resolves that the health, status, or condition of the monitored target is within the normal range, then little to no audio degradation is to be applied to the source digital media file. In contrast, when the analyzing step resolves that the health, status, or condition of the monitored target is within the alerting range, then a relatively high level of audio degradation is to be applied to the source digital media file, such that playback of the modified audio data results in a highly distorted, highly corrupted, or highly mutated version of the default audio content. If the analyzing step resolves that the health, status, or condition of the monitored target is within the warning range (that at least partially resides between the normal range and the alerting range), then a relatively low level of audio degradation is to be applied to the source digital media file, such that playback of the modified audio data results in a moderately distorted, moderately corrupted, or moderately mutated version of the default audio content.

In accordance with certain embodiments, the resolution of the change in audio degradation correlates directly to the delta of the range used. In this regard, a higher delta between minimum and maximum results in more gradual changes, and a lower delta results in more abrupt, or abrasive changes. For example, using a range of 0 to 1000 results in smoother or more continuous change, as compared to a range of 0 to 100.

If the process 300 determines that little to no audio degradation is to be used (the "No" branch of query task 312), then the audio portion of the source digital media file remains unmodified. As previously described, the source digital media file can be a digital music file that conveys music content, such that the modified audio data represents an audibly degraded version of the music content. Alternatively, the source digital media file can be a digital video file that conveys default audio content, such that the modified audio data represents an audibly degraded version of the default audio content. Thus, the process 300 controls playback of the unmodified audio data from the source digital media file 316 such that the "normal sounding" audio can serve as an audible indicator of normal health, status, or condition of the monitored target (task 314). In certain implementations that include a corresponding dashboard application, the process 300 may control or initiate the updating of the dashboard application in an ongoing manner and contemporaneously with controlling the playback of the unmodified audio data (task 318). For an implementation that monitors a plurality of similar targets, the playback of normal sounding, unmodified, undistorted, and non-degraded audio (e.g., music or a music playlist) means that all of the monitored targets are currently operating within the healthy or normal range. Consequently, a user listening to the source digital media file is provided with an audible indication that nothing needs immediate attention.

If, however, the process 300 determines that audio degradation is to be used (the "Yes" branch of query task 312), then at least the audio portion of the source digital media file 316 is modified in accordance with the determined level of audio degradation, resulting in modified audio data (task 320). The process 300 continues by controlling playback of the modified audio data such that the modified audio can serve as an audible indicator of abnormal or suspect health, status, or condition of the monitored target (task 322). In certain implementations that include a corresponding dashboard application, the process 300 may control or initiate the updating of the dashboard application in an ongoing manner and contemporaneously with controlling the playback of the modified audio data (task 324). For an implementation that monitors a plurality of similar targets, the playback of audibly distorted, degraded, or otherwise low quality audio (e.g., music or a music playlist) means that at least one of the monitored targets is currently operating within the alerting or warning health range. Consequently, a user listening to the modified audio file is provided with an audible indication that at least one monitored target needs immediate attention or should be closely watched. In response to this type of audible indication, the user can access the dashboard application, observe or select the suspect or unhealthy target, and view additional details regarding its current status.

Although the example described above uses three different health score ranges, an implementation of the system can support any number of different ranges. Moreover, the audio degradation methodology or algorithm can utilize a limited number of discrete levels of audio degradation or it can be relatively continuous, smooth, and dynamic, such that the level of audio degradation gradually increases in a manner that is proportional with worsening health of the monitored target.

Modification of the source audio data (at task 320) can be achieved using one or more audio manipulation, digital signal processing, or data processing techniques or technologies. Any one or a combination of available methodologies can be applied to the source audio data to audibly modify, degrade, corrupt, or distort the playback sound of the original audio information. In certain exemplary embodiments, the audio modification is achieved by bit-crushing the source digital media file to introduce quantization noise to the default audio content. Higher levels of bitcrushing result in more noise and worse perceived audio quality. Alternatively or additionally, the audio modification can be achieved by any of the following, alone or in any combination, without limitation: changing tone or pitch; fluctuating volume or source level gain of all, or a subset of, frequencies; altering playback speed; introducing audio dropouts; adding background noise; introducing audio frequency modulation (such as a "phaser" effect).

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4:
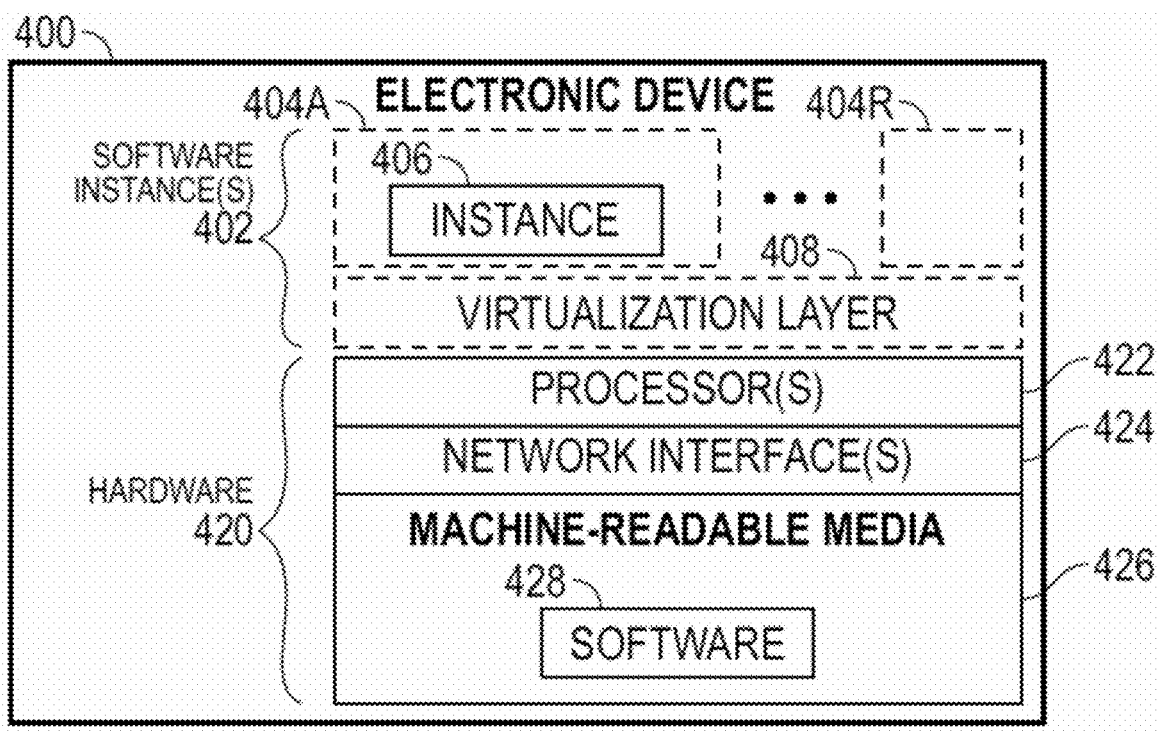
FIG. 4 is a simplified block diagram representation of an exemplary embodiment of an electronic device.

FIG. 4 is a simplified block diagram representation of an exemplary embodiment of an electronic device 400 according to some implementations. FIG. 4 includes hardware 420 including a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Referring to FIG. 1, for example, a monitored target 102, the health evaluation application 106, the dashboard application 110, and the audio processing application 114 may be implemented in one or more electronic devices 400.

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Figure 5:
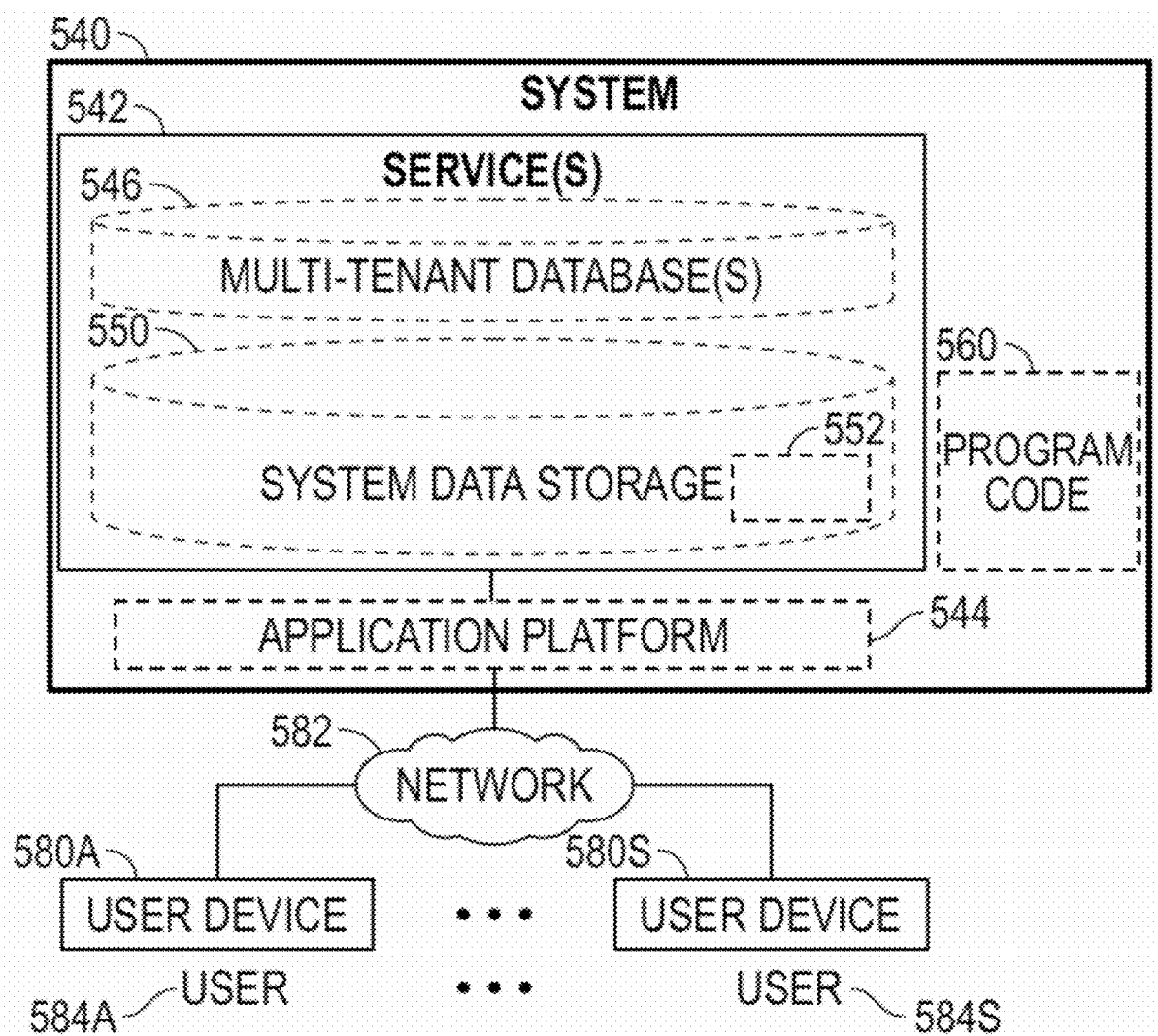
FIG. 5 is a simplified block diagram representation of an exemplary embodiment of a deployment environment.

FIG. 5 is a simplified block diagram representation of an exemplary embodiment of a deployment environment according to some implementations. A system 540 includes hardware (e.g., a set of one or more server devices) and software to provide service(s) 542, which may include the health evaluation service or application 106, the dashboard service or application 110, and/or the audio processing service or application 114. In some implementations the system 540 is in one or more datacenter(s). These datacenter(s) may be:1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services.

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 400 or include one or more features of the electronic device 400.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the authorization service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 6th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

It should be understood that various aspects disclosed herein may be combined in different arrangements than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a hardware based computing device.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A processor-implemented method of indicating health, status, or condition of a monitored target, the method comprising:
obtaining, by one or more data processors, at least one metric associated with the monitored target;
determining, by the one or more data processors, a level of audio degradation to be applied to a source digital media file that conveys default audio content, wherein the level of audio degradation is determined as a function of the obtained at least one metric which shifts pitch of the default audio content to generate a melody whose dissonance is in accordance with the determined level of audio degradation, wherein the dissonance causes the pitch of the melody to be out-of tune at an interval associated with health scoring data;
modifying, by the one or more data processors, the source digital media file in accordance with the determined level of audio degradation, resulting in modified audio data;
controlling, by the one or more data processors, playback of the modified audio data to serve as an audible indicator of the health, status, or condition of the monitored target; and
performing an inspection, by the one or more processors, of the health, status, or condition of the monitored target in response to the playback of the modified data;
wherein the source digital media file is a digital music file that conveys music content;
the modified audio data represents an audibly degraded version of the music content;
wherein the monitored target is a database system that includes multiple computer based server systems arranged in a cluster architecture;
wherein the shifted pitch of the default audio content indicates the current operating health of each cluster;
wherein warnings or alerts are generated to flag unhealthy or moderately unhealthy clusters.

2. The method of claim 1, wherein:
the source digital media file is a digital video file that conveys the default audio content; and
the modified audio data represents an audibly degraded version of the default audio content.

3. The method of claim 1, further comprising:
analyzing the at least one metric to resolve whether the health, status, or condition of the monitored target is within a normal range or an alerting range.

4. The method of claim 3, wherein:
when the analyzing step resolves that the health, status, or condition of the monitored target is within the normal range, the determining step determines that no audio degradation is to be applied to the source digital media file; and
when the analyzing step resolves that the health, status, or condition of the monitored target is within the alerting range, the determining step determines that a relatively high level of audio degradation is to be applied to the source digital media file, such that playback of the modified audio data results in a highly distorted, highly corrupted, or highly mutated version of the default audio content.

5. The method of claim 4, wherein:
the analyzing step analyzes the at least one metric to resolve whether the health, status, or condition of the monitored target is within the normal range, the alerting range, or a warning range that at least partially resides between the normal range and the alerting range; and
when the analyzing step resolves that the health, status, or condition of the monitored target is within the warning range, the determining step determines that a relatively low level of audio degradation is to be applied to the source digital media file, such that playback of the modified audio data results in a moderately distorted, moderately corrupted, or moderately mutated version of the default audio content.

6. The method of claim 1, further comprising:
maintaining a dashboard application to monitor the health, status, or condition of the monitored target; and
updating the dashboard application in an ongoing manner and contemporaneously with controlling playback of the modified audio data.

7. The method of claim 1, wherein modifying the source digital media file comprises:
bitcrushing the source digital media file to introduce quantization noise to the default audio content.

8. The method of claim 1, wherein the at least one metric comprises a numerical score that quantifies the health, status, or condition of the monitored target.

9. The method of claim 1, wherein:
the obtaining step obtains metrics associated with a plurality of monitored targets;

the determining step determines the level of audio degradation as a function of at least one metric obtained for a worst-performing monitored target of the plurality of monitored targets; and the controlling step controls playback of the modified audio data to serve as an audible indicator of the health, status, or condition of the worst-performing monitored target.

10. At least one non-transitory machine-readable storage medium that stores instructions executable by at least one processor, the instructions configurable to cause the at least one processor to perform a method of indicating health, status, or condition of a monitored target, the method comprising:

obtaining at least one metric associated with the monitored target;

determining a level of audio degradation to be applied to a source digital media file that conveys default audio content, wherein the level of audio degradation is determined as a function of the obtained at least one metric which shifts pitch of the default audio content to generate a melody whose dissonance is in accordance with the determined level of audio degradation, wherein the dissonance causes the pitch of the melody to be out-of tune at an interval associated with health scoring data;

modifying the source digital media file in accordance with the determined level of audio degradation, resulting in modified audio data;

controlling playback of the modified audio data to serve as an audible indicator of the health, status, or condition of the monitored target; and performing an inspection, by the one or more processors, of the health, status, or condition of the monitored target in response to the playback of the modified data;

wherein the source digital media file is a digital music file that conveys music content;

the modified audio data represents an audibly degraded version of the music content;

wherein the monitored target is a database system that includes multiple computer based server systems arranged in a cluster architecture;

wherein the shifted pitch of the default audio content indicates the current operating health of each cluster;

wherein warnings or alerts are generated to flag unhealthy or moderately unhealthy clusters.

11. The at least one non-transitory machine-readable storage medium of claim 10, wherein:

the method performed by the at least one processor further comprises the step of analyzing the at least one metric to resolve whether the health, status, or condition of the monitored target is within a normal range or an alerting range;

when the analyzing step resolves that the health, status, or condition of the monitored target is within the normal range, the determining step determines that no audio degradation is to be applied to the source digital media file; and when the analyzing step resolves that the health, status, or condition of the monitored target is within the alerting range, the determining step determines that a relatively high level of audio degradation is to be applied to the source digital media file, such that playback of the modified audio data results in a highly distorted, highly corrupted, or highly mutated version of the default audio content.

12. The at least one non-transitory machine-readable storage medium of claim 11, wherein:

the analyzing step analyzes the at least one metric to resolve whether the health, status, or condition of the monitored target is within the normal range, the alerting range, or a warning range that at least partially resides between the normal range and the alerting range; and when the analyzing step resolves that the health, status, or condition of the monitored target is within the warning range, the determining step determines that a relatively low level of audio degradation is to be applied to the source digital media file, such that playback of the modified audio data results in a moderately distorted, moderately corrupted, or moderately mutated version of the default audio content.

13. The at least one non-transitory machine-readable storage medium of claim 10, wherein modifying the source digital media file comprises:

bitcrushing the source digital media file to introduce quantization noise to the default audio content.

14. The at least one non-transitory machine-readable storage medium of claim 10, wherein:

the obtaining step obtains metrics associated with a plurality of monitored targets;

the determining step determines the level of audio degradation as a function of at least one metric obtained for a worst-performing monitored target of the plurality of monitored targets; and the controlling step controls playback of the modified audio data to serve as an audible indicator of the health, status, or condition of the worst-performing monitored target.

15. A computing system to indicate health, status, or condition of a monitored target, the computing system comprising:

at least one processor; and at least one non-transitory machine-readable storage medium that stores instructions executable by the at least one processor, the instructions configurable to cause the at least one processor to perform a method, comprising:

obtaining at least one metric associated with the monitored target;

determining a level of audio degradation to be applied to a source digital media file that conveys default audio content, wherein the level of audio degradation is determined as a function of the obtained at least one metric which shifts pitch of the default audio content to generate a melody whose dissonance is in accordance with the determined level of audio degradation, wherein the dissonance causes the pitch of the melody to be out-of tune at an interval associated with health scoring data;

modifying the source digital media file in accordance with the determined level of audio degradation, resulting in modified audio data;

controlling playback of the modified audio data to serve as an audible indicator of the health, status, or condition of the monitored target; and performing an inspection, by the one or more processors, of the health, status, or condition of the monitored target in response to the playback of the modified data;

wherein the source digital media file is a digital music file that conveys music content;

the modified audio data represents an audibly degraded version of the music content;

wherein the monitored target is a database system that includes multiple computer based server systems arranged in a cluster architecture;

wherein the shifted pitch of the default audio content indicates the current operating health of each cluster;

wherein warnings or alerts are generated to flag unhealthy or moderately unhealthy clusters.

16. The computing system of claim 15, wherein:

the method performed by the at least one processor further comprises the step of analyzing the at least one metric to resolve whether the health, status, or condition of the monitored target is within a normal range or an alerting range;

when the analyzing step resolves that the health, status, or condition of the monitored target is within the normal range, the determining step determines that no audio degradation is to be applied to the source digital media file; and when the analyzing step resolves that the health, status, or condition of the monitored target is within the alerting range, the determining step determines that a relatively high level of audio degradation is to be applied to the source digital media file, such that playback of the modified audio data results in a highly distorted, highly corrupted, or highly mutated version of the default audio content.

17. The computing system of claim 16, wherein:

the analyzing step analyzes the at least one metric to resolve whether the health, status, or condition of the monitored target is within the normal range, the alerting range, or a warning range that at least partially resides between the normal range and the alerting range; and when the analyzing step resolves that the health, status, or condition of the monitored target is within the warning range, the determining step determines that a relatively low level of audio degradation is to be applied to the source digital media file, such that playback of the modified audio data results in a moderately distorted, moderately corrupted, or moderately mutated version of the default audio content.

18. The computing system of claim 15, wherein modifying the source digital media file comprises:

bitcrushing the source digital media file to introduce quantization noise to the default audio content.

19. The computing system of claim 15, wherein:

the obtaining step obtains metrics associated with a plurality of monitored targets;

the determining step determines the level of audio degradation as a function of at least one metric obtained for a worst-performing monitored target of the plurality of monitored targets; and the controlling step controls playback of the modified audio data to serve as an audible indicator of the health, status, or condition of the worst-performing monitored target.

* * * * *